Nov. 1, 1938.  R. V. BURT ET AL  2,135,325
APPARATUS FOR FINISHING SOAP
Filed April 1, 1935  5 Sheets-Sheet 1

INVENTORS.
ROBERT V. BURT,
ROBERT A. DUNCAN,
AND ROBERT J. SHORT.
BY
ATTORNEYS.

Nov. 1, 1938.      R. V. BURT ET AL      2,135,325
APPARATUS FOR FINISHING SOAP
Filed April 1, 1935      5 Sheets-Sheet 2
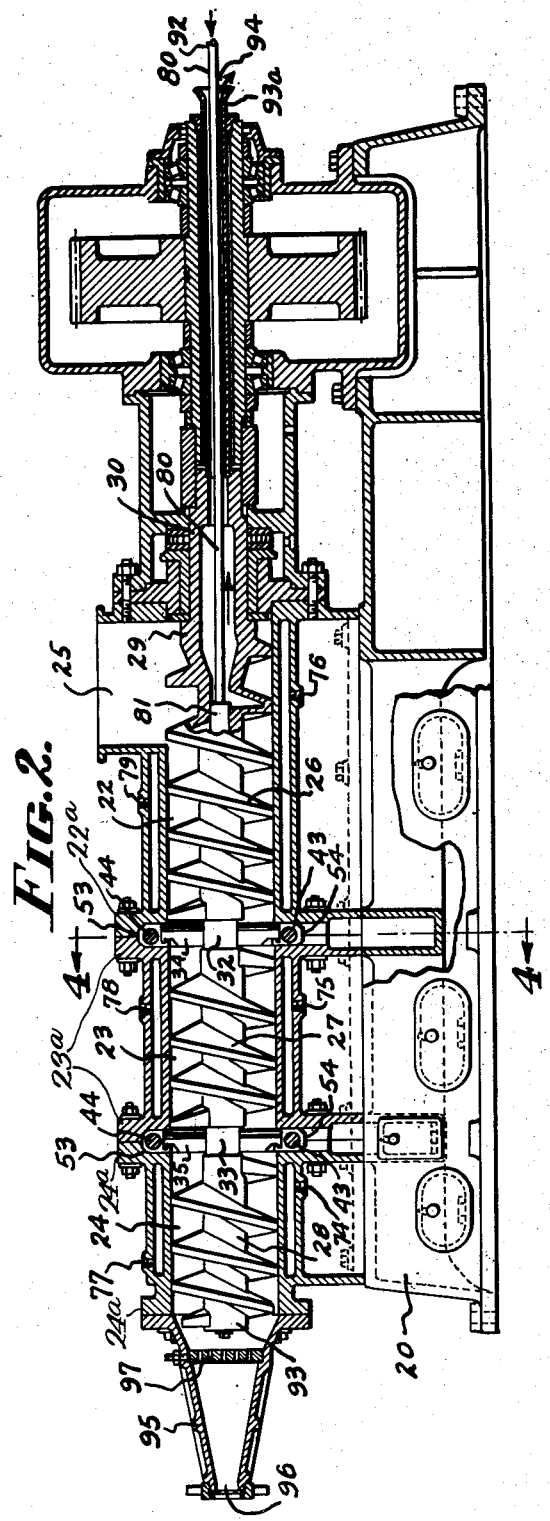
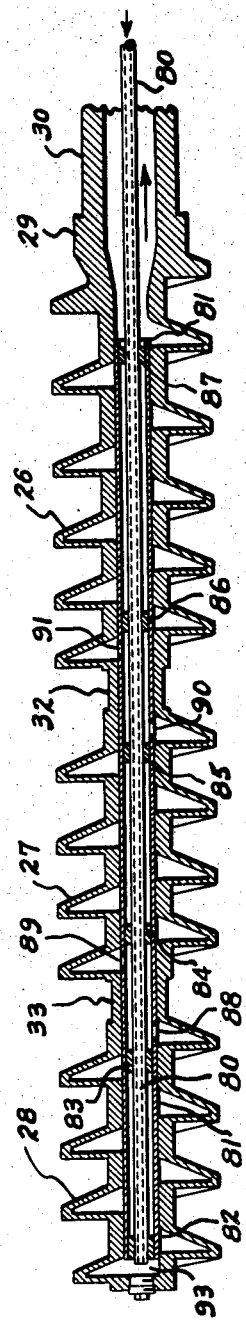
INVENTORS.
ROBERT V. BURT,
AND ROBERT A. DUNCAN,
ROBERT J. SHORT.
BY
ATTORNEYS.

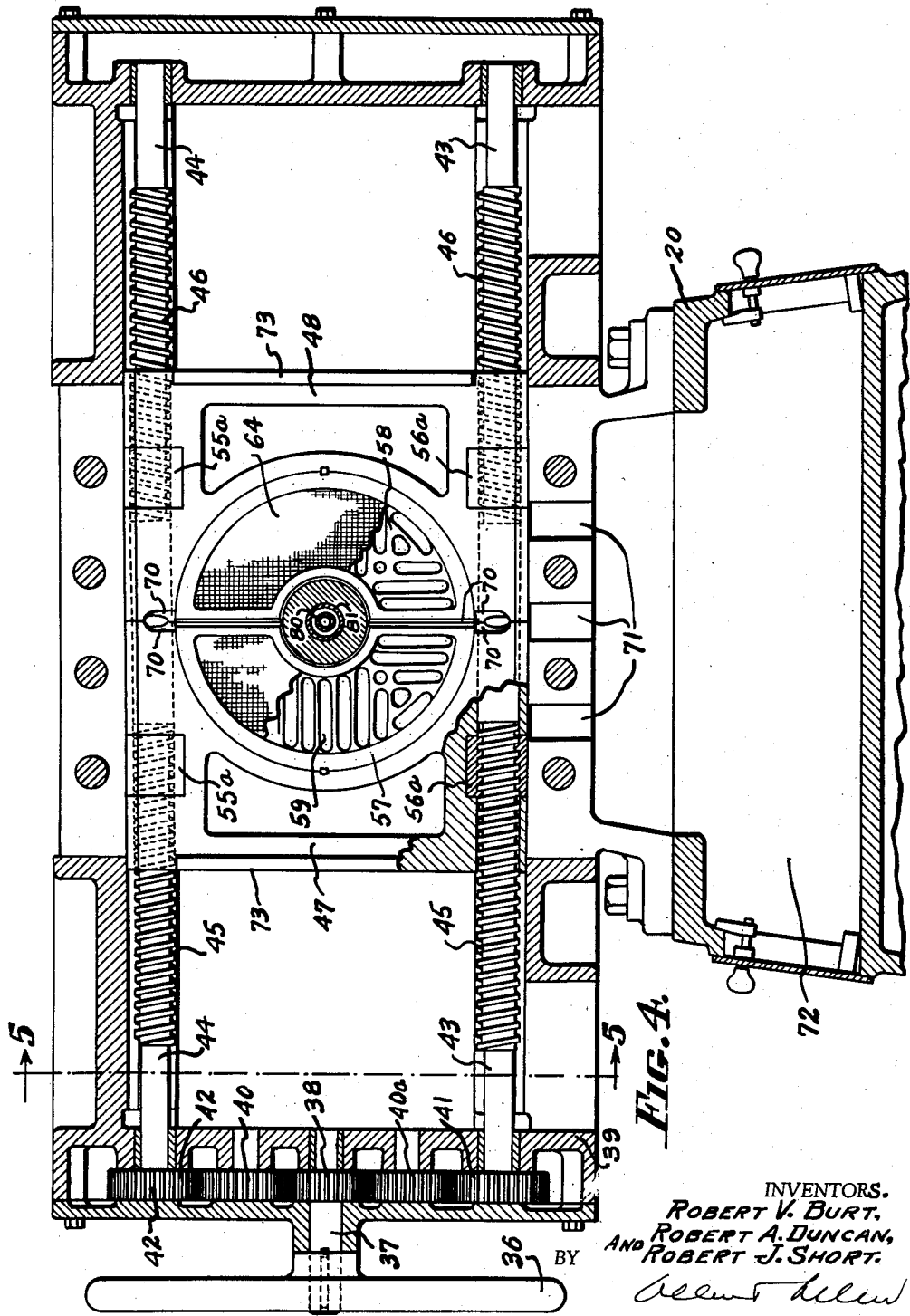

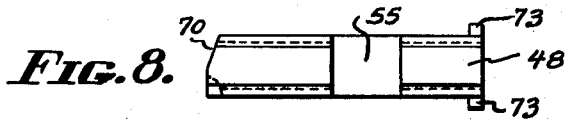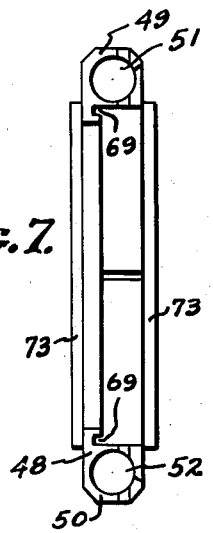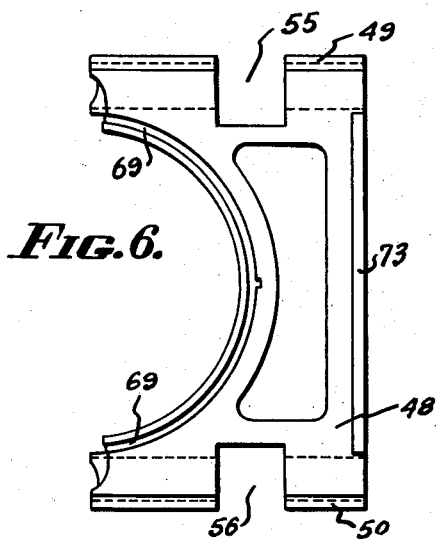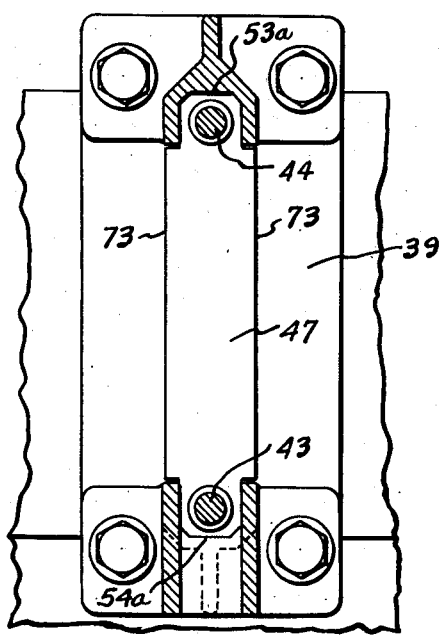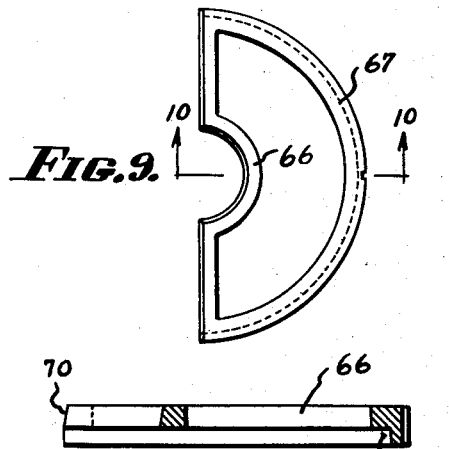

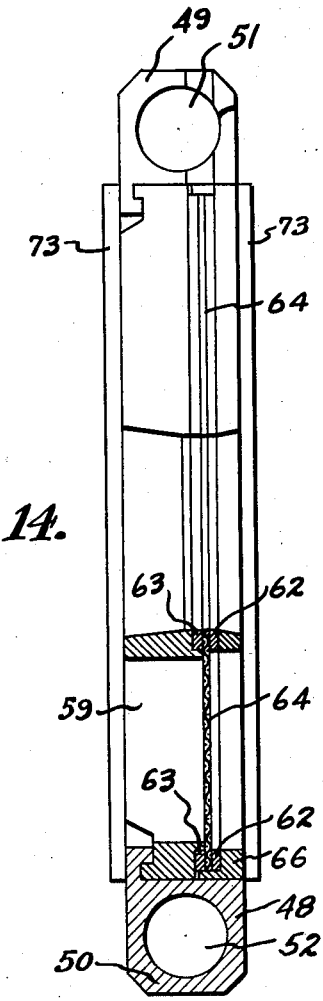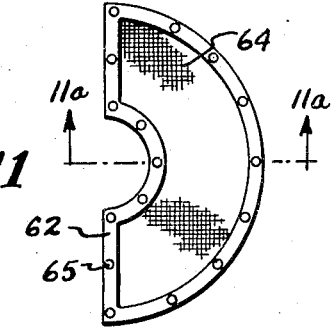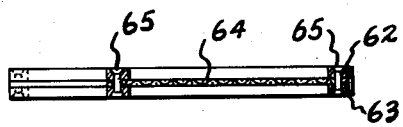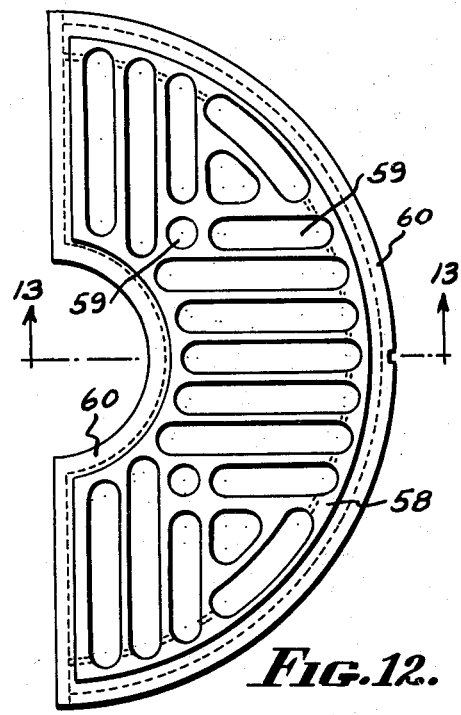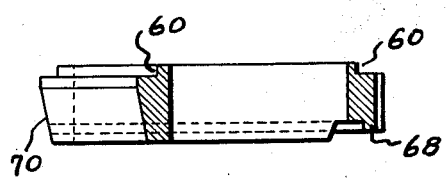

Patented Nov. 1, 1938

2,135,325

UNITED STATES PATENT OFFICE 2,135,325

APPARATUS FOR FINISHING SOAP

Robert V. Burt, Cincinnati, and Robert A. Duncan and Robert J. Short, Wyoming, Ohio, assignors to The Procter & Gamble Company, Cincinnati, Ohio, a corporation of Ohio Application April 1, 1935, Serial No. 14,104

11 Claims. (Cl. 87—16)

This invention relates to apparatus for milling and plodding soap, especially toilet soap, to ensure homogeneity and smoothness with better controlled conditions and a saving in labor and space over previously known procedures.

Objects of our invention are to conserve space, to reduce power consumption and labor, and to eliminate storage between the milling and plodding operations.

A further object is to obtain a toilet soap having improved quality.

A further object is to provide a screening device or similar subdividing element which is applicable for use in the type of soap milling device described herein and which can be removed and replaced with ease.

As far as we are aware, the milling and plodding operations have heretofore been carried out in separate and distinct pieces of apparatus. Further, as far as we are aware, the prior art does not disclose that the two operations required in the production of a suitable toilet soap can be combined and performed in a single apparatus nor are the advantages that would result from this combination even suggested. In the instant invention we have made a distinct advance in the art of soap finishing machines as will be noted from the following description.

In the accompanying drawings:—

Figure 2 is a vertical section of same taken on line 2—2, only part of the screw being shown in section;

Figure 3 is an enlarged sectional view of the screw taken on line 2—2 of Figure 1;

Figure 4 is a vertical section through the yoke, plate holder, plate, plate ring, screen holder, taken on line 4—4 of Figure 2;

Figure 5 is a vertical section of the yoke taken on line 5—5 in Figure 4;

Figure 6 is a plan view of the plate holder;

Figure 7 is an elevation view of one side of the plate holder;

Figure 8 is an elevation view of another side of the plate holder;

Figure 9 is a plan view of the plate ring or cutting ring;

Figure 10 is an enlarged view of a vertical section of the plate ring or cutting ring taken on the line 10—10 of Figure 9;

Figure 11 is a plan view of the screen and screen holder;

Figure 11a is a vertical section of the screen and screen holder taken on the line 11a—11a of Figure 11;

Figure 12 is a plan view of the perforated backing plate;

Figure 13 is a vertical section of the backing plate taken on lines 13—13 of Figure 12;

Figure 14 is a side elevation partly in section of a screening assembly showing the relative positions of plate holder, backing plate, cutting ring and screen holder.

Figure 1:
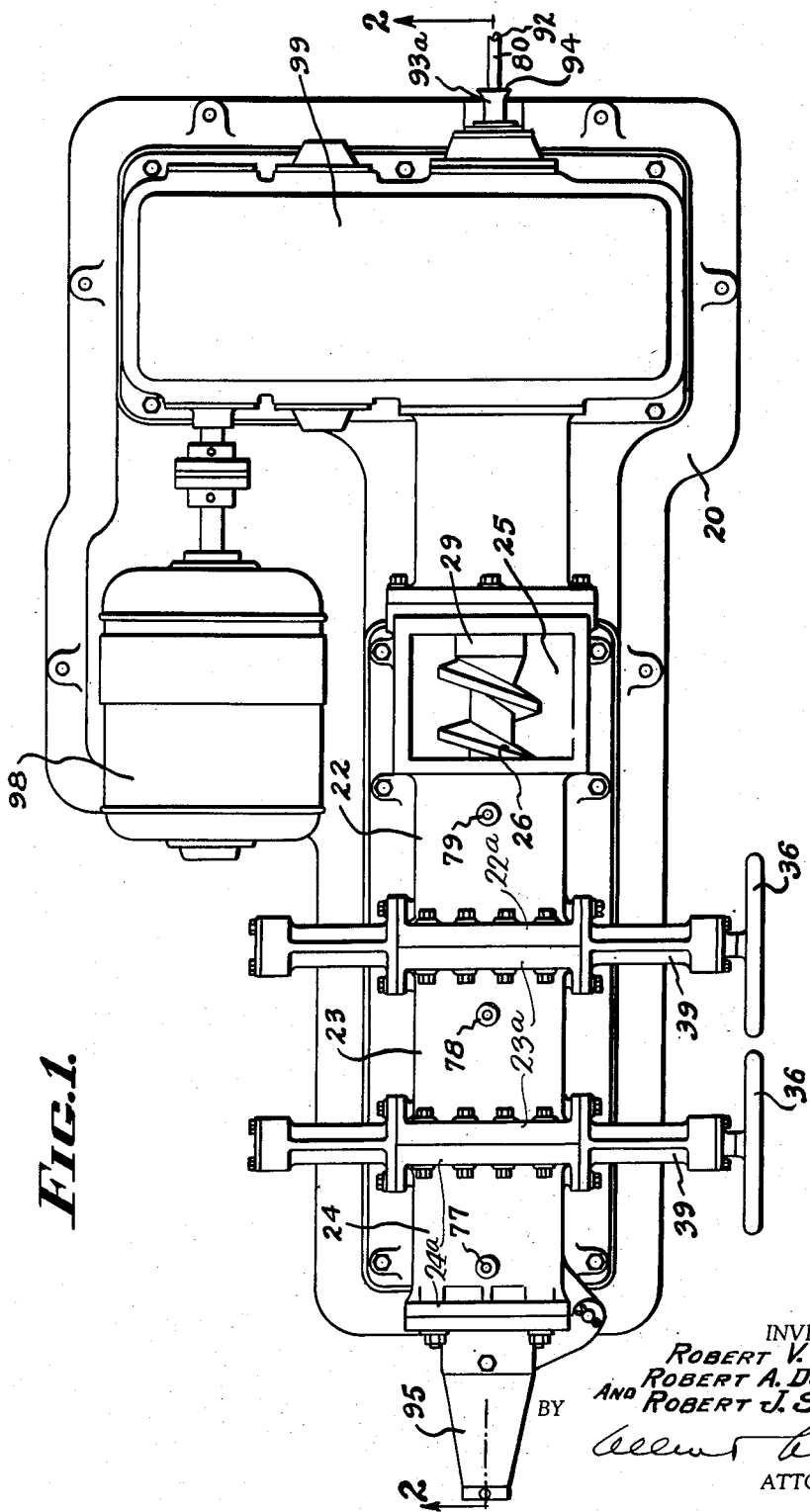
Figure 1 shows a plan view of our soap finishing machine.

Our invention consists of a compact, easily controlled, easily cleaned soap finishing machine comprising in combination, a series of circular milling chambers and a circular plodding chamber arranged on a common axis and separated by removable screens or strainers, and a common shaft extending through the chambers, having a screw feeding means within each chamber, so arranged that the soap is manipulated, or kneaded, by the feeding screw and simultaneously fed through a series of milling screens and a plodder, the milling screens being provided in segmental sections to permit their removal and replacement.

In Figures 1, 2, and 4, 20 designates a suitable base on which the soap finishing machine is mounted. A long circular chamber is composed of sectional chambers 22, 23, and 24, bolted together at their terminal flanges 22a, 23a and 24a, respectively, in a suitable manner as shown in Figures 1 and 2 and constituting respectively the first and second stage milling chambers and the plodding chamber. A hopper 25 communicates with the first milling chamber, providing a means for the introduction of the partially dried unfinished soap which is usually in flake form with or without added ingredients as desired. Mounted within the cylindrical chambers 22, 23, and 24, and concentrically therewith are feeding screws 26, 27, and 28, respectively, of well known type, all suitably attached to or formed integral with a common shaft 29 which is journaled at the end 30 in suitable bearing located near the inlet of chamber 22. The opposite end of the shaft may or may not be journaled in a bearing. In the present apparatus it is deemed sufficient that the outer edges of the screw substantially come in contact with the inner walls of the chambers and thereby give the shaft the necessary support. It will be noted that the shaft does not have feeding screw portions at 32 and 33 corresponding to the location of the screening assemblies 34 and 35 when the feeding screws are assembled within their respective chambers.

The purpose of the screens, orifices, or apertures in a plate, is, briefly, to effect subdivision of the soap alone or with added ingredients as the unmilled ingredients are forced therethrough, thus promoting homogeneity, and to screen out or remove from the soap any foreign substances, such as dirt, splinters, metallic particles, hard lumps of soap not easily incorporated in the main body of the soap, etc. Obviously these screens must be removed from time to time for cleaning, or must be replaced in case of wear or rupture under the high operating pressure.

In the construction of our soap finishing machine, we have provided a new and useful means for removal and replacement of these screens. The following description will be directed to only one screening assembly, it being understood that the same will apply equally to any other.

Referring to Figure 4 it will be seen that we have provided a handwheel 36 keyed to shaft 37, to which is also keyed pinion 38 housed within the end of one of the yokes 39. There are two of these arch-like yokes for each assembly, bolted to the ends of the cylinder flanges and forming continuations thereof. Idler pinions 40 and 40a are intermeshed with pinion 38 and transmit motion applied at the handwheel to intermeshed pinions 41 and 42, respectively, which are keyed to two synchronously acting shafts 43 and 44, respectively. Each shaft is threaded at portions 45 and 46, one portion having a right hand thread, the other portion having a left hand thread adapted so that rotation of the shaft will cause movement of mechanisms engaging each of the threads either toward or away from each other depending on the rotation of the shaft and the manner of threading.

The mechanism which is adapted to be moved by the threaded shafts 43 and 44 is termed a plate holder, a preferred example of which is shown in Figures 4, 6, 7, 8, and 14. Each plate holder is divided into halves or segmental sections 47 and 48 adapted to be moved by the synchronously acting shafts 43 and 44, respectively, either away from each other when screen replacement is desired or toward each other into the operating position shown in Figure 4. The top and bottom 49 and 50 of the plate holder (see Figures 6, 7, 8) contain bores 51 and 52, respectively, extending horizontally through each half of the plate holder. The axes of the bores are at right angles to the axis of the chambers and are adapted to accommodate the shafts 44 and 43, respectively. The edges of the portions 49 and 50 are adapted to slidably engage the grooves 53 and 54, respectively, formed by channels cut away at two sides of the abutting flanges of the sectional cylinders at right angle to the bore thereof (see Figure 2), and also the extensions 53a and 54a of said grooves formed in the top and bottom legs of the yokes 39 (see Figure 5). Thus there are formed by said channels and said grooves passageways across and between said cylinders so as to accommodate the screening assemblies 34 and 35 as shown in Figure 2.

The top and bottom of each half of the plate holder are cut away at right angles to the axis of the apertures provided for the shafts, to form slots shown at 55 and 56 in Figure 6. Within these slots can be positioned threaded nuts 55a and 56a (see Figure 4) adapted to engage with the corresponding threaded portions of the shaft. The nuts are obviously formed so that they fit snugly within the slots and thus do not turn when the shafts 43 and 44 are operated. Any equivalent method of causing the halves of the plate holder to move in response to the operation of the shafts may be used. For example, the entire length of the bores in each half of the plate holder may be threaded to engage with the respective threads on the shafts. Thus with the operation of the handwheel 36, shafts 43 and 44 are caused to rotate synchronously, which rotation causes the halves of the plate holders to slide toward or away from each other within the grooves 53 and 54 and their respective extensions in the yoke 39.

In our construction, the individual elements, the cutting ring, the screen holder, and the backing plate, are preferably assembled into a complete unit, which unit is then inserted in the plate holder which then makes up the screening assembly. Since each of the elements is divided into two segmental sections of substantially identical construction, the following description will be directed to one segmental portion of each element.

The screen holder consists of two clamping rings, 62 and 63, shaped as semi-circular ring sectors for each half of the structure between which a suitable screen 64 of ring-sector shape is held, as shown in Figures 11, 11a, and 14. Any suitable means may be employed for holding the screen 64 tightly between the two clamping rings. For example, in Figures 11 and 11a, the two rings are fastened together by means of screws 65 sufficiently securely to hold the screen therebetween under normal operating conditions.

It will be noted that the segmental sections of the screen holder are so constructed that when the two halves are in operating position a central aperture is provided for the worm shaft. Furthermore, the screen holder is so constructed that surface of this inner circular aperture will be substantially in contact with the feeding screw shaft during operation. Passage of soap between the shaft and the screen holder is therefore of negligible proportion.

As previously stated, one of the purposes of the screens is to remove foreign material and hard lumps of soap not desirable in the finished product. This material builds up on the screen, gradually closes the orifices in the screen and thus prevents passage of the soap therethrough. At certain intervals, therefore, screens must be removed and cleaned.

In the operation of our soap finishing machine, we have found it advisable to remove from the milling chamber along with the screening assembly when same is removed for cleaning or for any other reason a small layer of the soap which has not yet passed through the screen and which is adjacent thereto. It will be noted that if the screen holder were removed alone, a certain amount of the foreign material would adhere to the soap adjacent the screen and remain in the cylinder, thus immediately clogging the newly replaced screen as soon as operation is started with the new screen in position.

To effect removal of a small layer of soap, therefore, we have provided a cutting ring 66 shown in Figures 9 and 10. This ring also is composed of segmental sections of like shape to the ring sectors. The ring may be of any desired thickness, depending on the amount of soap it is desired to remove when the screen assembly is removed from its operating position. Around the inner edge of the face which is to be adjacent to the screen, extends a groove 67 of suitable dimensions to engage with the screen holder as shown in Figure 14. The opposite face of the screen holder engages a similar groove 60 on the edge of the backing plate as will be described below.

In our apparatus we prefer to use screens having very small openings or orifices as will be more fully explained below. Thus we have found it necessary to employ an apertured backing plate such as that shown in Figures 4, 12 and 13. This plate, as previously stated, is also formed in two ring-sector sections 57 and 58. Each section is apertured in some suitable manner such as that shown in Figure 12 at 59. It is desirable, of course, that the total apertured area in the screen backing plate be greater than the total apertured area in the screen in order that a minimum resistance to the flow of soap is offered by the backing plate. Around the edge of the plate holder extends a groove 60 of suitable dimensions to hold one half of the segmental screen holder or clamping ring 63 and to allow the screen direct contact with the backing plate.

In the assembly of the screening unit, (see Figure 14), the clamping rings 62 and 63 containing the screen 64 therebetween and forming the screen holder are placed on top of the backing plate so that clamping ring 63 of the screen holder fits snugly in the groove 60 provided therefor. The screen will substantially come in contact with the backing plate when the correct position is obtained.

The cutting ring is then placed on top of the screen holder with the clamping ring 62 fitting snugly in the groove 67 provided therefor in the cutting ring.

Each assembled segmental unit is then positioned in its respective plate holder with the tongue 68 of the backing plate (Figure 13) fitting snugly in the groove 69 of the plate holder (Figures 6 and 7). The ring sector sections of the screening assembly, now held by the yoke, are forced into operating position by proper rotation of the handwheel 36.

The edges of the segmental portions of the plate holder and backing plate are bevelled as shown at 70 in Figures 4, 6, 8, 10, and 13. We have found this construction desirable, as will be noted, to insure contact between the ring sector portions when said portions are moved to the closed position after the substitution of a clean screen. It is obvious that the soap will be under very high pressure during the operation of the finishing machine, and in the removal of a screen a certain amount of expansion in the soap will occur, the space previously occupied by the screening assembly being partially filled with soap. The bevelled edges on the backing plate, cutting ring and plate holder previously described assist in the displacement of this soap as the screening assembly with the newly inserted screens is forced into operating position.

The soap removed by the bevelled edges of the backing plate, plate holder and cutting ring falls through the apertures 71 in the bottom of the chamber into the compartment 72 formed in the base of the machine (see Figure 4). The soap scrap can be removed from this compartment by hand or otherwise, from time to time, as desired. As the screening assembly is moved into position, communication between the milling chamber and the lower compartment 72 is cut off by the sliding bottom of the plate holder so that when the screens are again in operating position passage of the soap is necessarily through the milling screens and to the plodding chamber. It is understood, of course, that the passage for the screening assemblies between the chambers, slidably engages the faces of the plate holder making a tight fit so as to prevent leakage of the soap therebetween. To insure against leakage, however, we have provided the plate holder with ledges or extensions 73 which make contact with the exterior face of the chamber when the screens are in an operating position (see Figures 6, 7, 8, and 14).

Temperature control of the soap is necessary or at least desirable during the extrusion of the soap through minute orifices to maintain suitable fluidity and thus secure proper amalgamation and homogeneity. This temperature should neither be so high as to cause too great fluidity of the soap, nor so low as to cause the soap to harden and interfere with its proper handling during the process of finishing. To insure proper temperature control, we have found it desirable to use jacketed chambers as indicated in Figure 2. 74, 75, and 76 indicate inlets for a temperature controlling medium to the three jacketed chambers. Outlets 77, 78, and 79, respectively, are provided in the respective chambers for conducting the temperature controlling medium away from the finishing machine. Likewise, we have found it desirable to provide means for the circulation of a temperature controlling liquid through the feeding screw. In the present disclosure we have found it preferable to use a feeding screw not only centrally hollow, but also hollow in the screw vane. To conduct the temperature controlling fluid in suitable manner through the hollow vanes of the screw we have provided substantially concentric tubes 80 and 81. Tube 80 is held in a concentric position relative to tube 81 by means of collars 82, 83, 84, 85, 86, and 87. Apertures 88, 89, 90, and 91 are provided in the external tube 81 in order that the temperature controlling fluid may be conducted from one end of the feeding screw through the vanes to the other end of the feeding screw in the following manner.

The liquid enters the internal tube 80 at point 92 and travels the entire length of said tube to the extreme end of the feeding screw 93. Then the liquid flows through the hollow passage within the screw vanes to the aperture 88, then travels through the annular space provided by the walls of the concentric tubes 80 and 81 to aperture 89 where the liquid is discharged into the hollow portion of the screw within the second stage of the milling device. It will be noted that the collars are positioned so as to direct the flow of the temperature controlling medium. The liquid continues its travel through the screw, effecting temperature control of the soap in contact with the external portion thereof, and passes through the aperture 90 through the annular passage provided by the walls of concentric tubes as previously described, through the aperture 91 into the hollow portions of the screw associated with the first stage of the milling device. The liquid then continues its travel through the hollow central portion of the screw shaft into auxiliary tube 93a and exits at 94. Any suitable means may be provided for conducting the temperature controlling liquid to and away from the inlet 92 and outlet 94, respectively.

Although in the instant disclosure the use of two screening devices is set forth, it is to be understood that we are not limited thereto. Obviously the number and character of the screening devices may be altered as occasion requires without affecting the broad concepts of our invention. For example, a number of screens substantially constructed and having relatively large orifices may be superimposed in a staggered fashion so that the soap follows a zig-zag path or is subdivided and recombined a number of times in its passage through the screens. This construction may be used to effect additional kneading and amalgamation if desired. Furthermore, the size of the screen orifices may be altered as the conditions of the soap base may necessitate. For an average type of soap base we have found, for example, that one screen of approximately 30 mesh may be used in the first stage of the milling and another screen of 60 mesh in the second stage of the milling with satisfactory results.

The last chamber 24 may be similar to that associated with any of the well known types of plodding devices having a feeding screw 28 adapted to force the soap through a perforated plate 97 into a converging nose 95, thence through a constricted extruding aperture 96. The perforated plate 97 need not be in segmental sections, but may be bolted on in any of the suitable manners known in the art.

In the use of our milling device, soap, usually in flake form, dried to suitable moisture content, is delivered to the hopper 25, together with any desired ingredients such as perfume, coloring matter or any other of the constituents commonly added in the usual milling operation. The feeding screw 26 carried on the single shaft 29 which is operated by a motive means such as 98 through a speed reduction unit 99, carries the soap and partially mixed ingredients to the first screening assembly 34, in which operation kneading or manipulation of the soap is effected, the temperature of the soap being controlled by a liquid flowing through the jackets of the chambers and by another or the same liquid flowing through the internal channels of the feeding screw to insure proper soap consistency for the milling and plodding operations. Ordinarily this consistency is obtained by maintaining the soap at a slightly elevated temperature. The soap is then forced through the screen which assists in the homogenizing action, and screens out any undesirable impurities contained in the soap base. The feeding screw 27 further works together the threads of once screened soap and simultaneously carries it forward and forces it through a second stage screening assembly 35 which preferably contains smaller orifices than the first stage screen. After the soap has passed through the final screen of the milling device, the milling operation may be considered complete. The feeding screw 28 then carries the milled soap forward to the perforated plate 97, forces it therethrough into the converging nose 95, thence through the constricted orifice 96. The soap extrudes from this orifice in any form suitable for subsequent operations. These operations usually include cutting into suitably shaped bars and stamping same.

In order to replace screens, the operation of the feeding screws is discontinued and handwheel 36 is turned in the direction necessary to cause the segmental portions of the screening assembly to move from the operating position into the yoke. In this position the cutting rings may be removed, clean screens inserted, and the cutting rings replaced. Turning the handwheel in the opposite direction will move the screening assembly into operating position after which operation may be resumed.

Having thus described our invention, what we claim and desire to secure by Letters Patent is:—

1. A soap treating machine comprising in combination two co-axial cylinders having abutting flanges, said flanges cut away at two sides to leave a passageway across and between the two cylinders, grooves forming a slideway on opposite sides of said passageway formed in the meeting faces of the flanges, complementary screening elements movable across said passageway in said grooves, means for forcing said complementary screening elements into position between the cylinders and withdrawing the same therefrom, a single shaft passing through both cylinders, feeding flights on said shaft within the cylinders, said complementary screening element arranged with complementary curved portions to seat over the shaft between the cylinders.

2. A soap treating machine comprising in combination a pair of milling cylinders, and a plodder communicating with each other and arranged in a straight line on a common axis, feeding means mounted on a common shaft within said cylinders and plodder for causing soap to travel through them progressively, screening means at the outlet of each milling cylinder removable substantially at right angles to the axis of said cylinders, and means associated with said screening means also removable for cutting out and removing from the path of the soap a layer of soap that is in engagement with the screening means at the time of removal.

3. A soap treating machine comprising in combination a pair of milling cylinders, and a plodder communicating with each other and arranged in a straight line on a common axis, feeding means mounted on a common shaft within said cylinders and plodder for causing soap to travel through them progressively, screening means at the outlet of each milling cylinder removable substantially at right angles to the axis of said cylinders, and means associated with said screening means also removable for cutting out and removing from the path of the soap a layer of soap that is in engagement with the screening means at the time of removal thereof, said screens being progressively of smaller sized apertures.

4. In a continuous soap milling machine of the type having a series of cylindrical co-axial milling chambers with individual feeding screws mounted therein on a common shaft to knead the soap and force same through said machine, removable screening means at the outlet of each milling chamber, those screening means interposed between successive chambers being formed in complementary halves, slidably engageable with the adjacent ends of the walls of said successive chambers, and movable toward each other into operating position in the path of the soap and away from each other into inoperative position out of the path of the soap.

5. In a continuous soap milling machine of the type having a series of cylindrical co-axial milling chambers with individual feeding screws mounted therein on a common shaft to knead the soap and force same through said machine, removable screening means at the outlet of each milling chamber, those screening means interposed between successive chambers being formed in complementary halves, slidably movable toward and away from each other and comprising in combination complementary plate holders, complementary backing plates, complementary screens and complementary cutting rings.

6. In a continuous soap finishing machine of the type having successive communicating cylindrical milling chambers and a cylindrical plodding chamber on a common axis with individual feeding screws mounted therein on a common shaft to knead the soap and force same through said machine, removable screening means at the outlet of each milling chamber, those screening means interposed between successive chambers being formed in complementary halves, slidably engageable with the adjacent ends of the walls of said successive chambers and movable toward each other into operating position in the path of the soap, and away from each other into inoperative position out of the path of the soap.

7. In a continuous soap finishing machine of the type having successive communicating cylindrical milling chambers and a cylindrical plodding chamber on a common axis with individual feeding screws mounted therein on a common shaft to knead the soap and force same through said machine, removable screening means at the outlet of each milling chamber, those screening means interposed between successive chambers being formed in complementary halves, slidably movable toward and away from each other, and comprising in combination complementary plate holders, complementary backing plates, complementary screens and complementary cutting rings.

8. In a continuous soap milling machine of the type having a series of cylindrical co-axial milling chambers with individual feeding screws mounted therein on a common shaft to knead the soap and force same through said machine, two cylinders having abutting flanges, said flanges cut away at two sides to leave a passageway across and between the two cylinders, grooves forming a slideway on opposite sides of said passageway formed in the meeting faces of the flanges, and complementary screening elements movable across said passageway in said grooves.

9. In a continuous soap milling machine of the type having a series of cylindrical co-axial milling chambers with individual feeding screws mounted therein on a common shaft to knead the soap and force same through said machine, two cylinders having abutting flanges, said flanges cut away at two sides to leave a passageway across and between the two cylinders, grooves forming a slideway on opposite sides of said passageway formed in the meeting faces of the flanges, complementary screening elements movable across said passageway in said grooves, and means for forcing said complementary screening elements into position between the cylinders and for withdrawing the same therefrom.

10. In a soap milling machine of the type having a series of cylindrical co-axial milling chambers with individual feeding screws mounted therein on a common shaft to knead the soap and force the same through said machine, two abutting co-axial cylinders, grooves formed by the meeting faces of said cylinders so as to form a slideway between said cylinders and screening means movable into and out of operative position in said slideway substantially at right angles to the axis of said cylinders and adapted to embrace said common shaft when in operating position so that substantially all of said soap passes through said screening means on passage of said soap through said machine.

11. In a soap treating machine having cylindrical chambers arranged tandem on a common axis and adapted to accommodate feeding screws therein mounted on a common shaft, a screening unit formed in complementary halves for sliding between two of said cylindrical chambers, said halves of said screening unit each having a plate holder, a screening element, an apertured backing plate for said screening element, and a cutting ring for removing from the path of the soap a layer of soap that is in engagement with the pressure side of said screening element at the time of removal, said cutting ring seating upon said screening element, said screening element seating upon said apertured backing plate, and said backing plate seating on said plate holder.

ROBERT J. SHORT.
ROBERT V. BURT.
ROBERT A. DUNCAN.